Aug. 21, 1956     A. J. IMMESOETE     2,759,409
MARKER CONTROL ARM MOUNTING
Filed Aug. 6, 1953
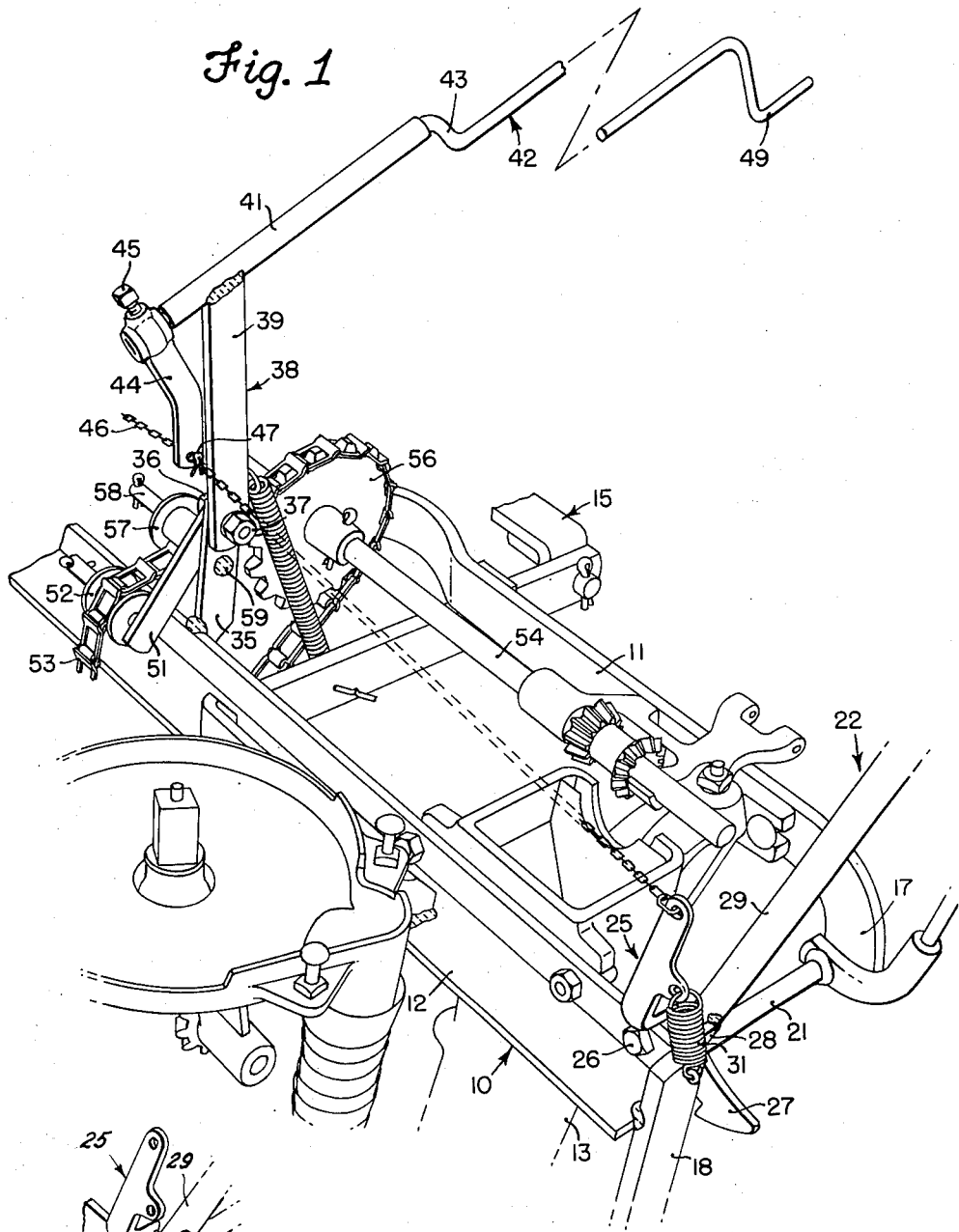
*INVENTOR.*
ARTHUR J. IMMESOETE
BY
Roger C. Johnson
ATTORNEY

United States Patent Office 2,759,409
Patented Aug. 21, 1956

2,759,409

MARKER CONTROL ARM MOUNTING

Arthur J. Immesoete, Moline, Ill., assignor to Deere & Company, Moline, Ill., a corporation of Illinois Application August 6, 1953, Serial No. 372,645

5 Claims. (Cl. 97—230)

The present invention relates generally to agricultural implements and more particularly to planters, especially planting units adapted to be connected directly with a farm tractor having means for raising and lowering the planter into and out of transport and operating positions.

The object and general nature of the present invention is the provision of a new and improved marker control mechanism wherein the selected marker arm may be dropped into marking position by the operator without requiring that he leave the seat of the tractor, and still further, an important feature of this invention is the provision of a marker control mechanism that may be adjusted so as to dispose the same in a position for easy actuation by the operator, irrespective of whether the operator is tall or short, or whether one kind or another kind of tractor is used as the propelling and supporting agency for the planter.

More specifically, it is a feature of this invention to provide manually operated means for operating the latches of a planter marker arm assembly, which means includes a marker latch release rod that normally extends to a position adjacent the operator's station on the tractor, with means for adjustably supporting said rod, so as to raise and lower the front end thereof, as desired, or necessary, without materially changing the relation between the marker arm latches controlled by the release rod. Particularly, the controlling rod, according to the present invention, is carried in a support that is adjustable about a pivot axis, which axis is closely adjacent the end of the arm that is fixed to the rod and which is connected with the associated latches. As a result of this construction, rocking the rod support about its pivot axis produces substantially little change in the position of the latch-operating arm and the latches associated therewith.

A further feature of this invention is the provision of a combined support and attaching means for the adjustable release rod support and an associated idler-supporting arm, which is provided to maintain the driving chain for the seeding shaft in the proper state of tautness.

These and other objects and advantages of the present invention will be apparent to those skilled in the art after a consideration of the following detailed description taken in conjunction with the accompanying drawings, in which:

Figure 1 is a fragmentary perspective view of a tractor-carried planter, showing the details of the marker latch control means and the associated idler-supporting means.

Figure 2 is a fragmentary detail of the marker controlling latch and associated parts.

The frame of the planter is indicated in its entirety by the reference numeral 10 and includes a front crossbar 11 and a rear crossbar, preferably in the form of an angle, as indicated at 12. Carried by the frame 10 is a pair of runner shanks 13, only one of which is shown in the drawings, and centrally of the frame 10 the latter carries a hitch-frame-receiving structure 15 by which, with other means not shown, the planter is adapted to be connected with the rear end of a propelling tractor.

Secured to each end of the front crossbar 11 is a downwardly extending section 17, and secured to each end of the rear angle 12 is a downwardly extending bar 18. The extensions 17 and 18 carry suitable bearing means receiving a fore-and-aft extending marker arm shaft 21 to which a marker arm, indicated in its entirety by the reference numeral 22, is connected. There is a marker arm 22 and associated parts at each side of the frame 12, but since the marker arms are identical, a description of one, with its associated locking latch mechanism, will suffice.

A marker controlling latch 25 is disposed at each end of the angle 12 and each is mounted on a pivot bolt 26 carried by the associated end of the angle 12. Each latch member 25 includes a latching extension 27 that is adapted to engage an associated abutment 28 that is fixed, as by welding, to the main arm section 29 of the marker 22. A spring 31 is connected to urge the latch 25 into marker arm engaging position so that, whenever the marker arms are raised into a transport position, they are automatically locked in their raised position and remain in that position until they are released, as by raising the associated latch extension 27 upwardly out of engagement with the associated abutment 28.

The generally central portion of the planter frame 10 has an upstanding bracket 35 fixed thereto, preferably by welding to the vertical flange of the front angle 12, and the upper end of the bracket 35 is apertured to receive a bolt 36 on the threaded end of which a nut 37 is mounted. A support member 38 is rockably mounted on the bolt 36 and extends generally upwardly. The support member 38 comprises a generally vertically extending bar 39 to the upper end of which a generally fore-and-aft extending sleeve 41 is secured, as by welding. Rockably mounted within the sleeve 41 is a latch-operating rod 42 in which an offset section 43 is formed, the section 43 serving as an abutment at the front end of the sleeve 41 to prevent rearward axial displacement of the rod 42 within the sleeve 41. The rear end of the rod 42 extends outwardly of the rear end of the sleeve 41 and carries a latch-operating arm 44 that is fixedly secured thereto by any suitable means, such as a set screw 45. The lower end of the arm 44 is apertured and receives a chain 46 the central portion of which is connected with the lower end of the rod 44 and held against movement therein by a pair of cotters 47, one at each side of the lower end of the arm 44. One end of the chain 46 extends toward the right of the machine and is connected to the upper end of the marker latch 25. The other end of the chain 46 extends to the other side of the machine and is likewise connected to the marker-controlling latch at that side of the planter. The front end of the rod extends upwardly and forwardly and terminates in a handle section 49 which the operator may grasp without leaving the seat of the tractor. By swinging the handle section 49 in one direction or the other one or the other of the latches 25 is operated to release the associated marker arm 22 and permit it to drop to the ground. For best and most convenient operation, some operators may require the handle end 49 of the rod to be raised or lowered, and the same is true if the farmer should change to a different tractor, requiring a different elevation of the handle end 49. The present invention contemplates readily adjusting the position of the handle end 49 of the marker-controlling rod by the simple expedient of loosening the nut 36, rocking the rod support member 38 in one direction or the other to dispose the handle end at the right location, and then retightening the bolt and nut means 36, 37. Further, according to the principles of the present invention, the same bolt 36 is utilized as a support for a bar 51, the upper end of which is apertured to receive the bolt 36, upon which an idler roller 52 is disposed. The idler roller 52 receives a chain 53 that serves to actuate the drive shaft 54 of the seeding mechanism of the planter, the forward portion of the chain 53 being trained over a sprocket 56 that is fixed to the generally central portion of the drive shaft 54. The upper portion of the chain 53, in addition to passing over the idler roller 52, also passes underneath a second idler roller 57 that is rotatably supported on a stub shaft 58 that is fixed in any suitable way, as by welding, indicated at 59, to the bracket 35 just underneath the bolt 36. Thus, when the bolt 36 and nut 37 are tightened, not only is the latch-controlling rod support 38 locked in the desired position but, in addition, the idler arm 51 is held in the selected position of adjustment. If, through wear or the like, the chain 53 should become too loose, the bolt 36 may be loosened and the arm 51 swung upwardly slightly, and then the bolt 36 and nut 37 retightened. This may be done most conveniently when an adjustment is made in the vertical elevation of the marker-controlling rod 42, but of course adjustment of either the supporting members 38 or 51 may be made at any time desired, merely by loosening the bolt and nut means, shifting the associated supporting member to the desired position, and then retightening the bolt and nut means.

While I have shown and described above the preferred structure in which the principles of the present invention have been incorporated, it is to be understood that my invention is not to be limited to the particular details, shown and described above but that, in fact, widely different means may be practiced in the broader aspects of my invention.

What I claim, therefore, and desire to secure by Letters Patent is:

1. In a planter including a frame, a marker arm swingably connected with said frame and movable between a lowered position and an elevated position, and a latch movably mounted on the frame releasably holding the marker arm in an elevated position, marker control means comprising a bracket, means to fix said bracket to said frame, a marker release rod support pivotally connected with said bracket, means holding said support in different positions relative to said bracket about the axis of said pivotal connection, a marker release rod rotatably carried by said support, a release arm fixed to said rod and extending to a point adjacent said axis, and a connection from said release arm adjacent said point to said latch, whereby in different positions of said support relative to said bracket, operation of said release rod acts through said release arm to move said latch.

2. The invention set forth in claim 1, further characterized by said bracket and support being apertured, and bolt and nut means forming the pivotal connection between said support and bracket and adapted, when loosened, to accommodate shifting of the support to different positions relative to the bracket.

3. The invention set forth in claim 1, further characterized by said support including a generally vertically extending member, and a sleeve member fixed to the upper end of the generally vertically extending member and receiving and supporting the associated latch release rod, said rod being rockable within said sleeve.

4. The invention set forth in claim 3, further characterized by an abutment section on said rod at one end of said sleeve, and said latch-operating arm being fixed to said rod at the other end of said sleeve, said abutment section and said arm serving to prevent axial displacement of said latch-operating rod in said sleeve.

5. The invention set forth in claim 4, further characterized by an offset portion in said rod forming said abutment section.

References Cited in the file of this patent

UNITED STATES PATENTS

| | | |
|---|---|---|
| 1,048,748 | Seaman | Dec. 31, 1912 |
| 2,585,992 | Bjerkan | Feb. 19, 1952 |